United States Patent
Koyatsu et al.

(10) Patent No.: US 8,736,903 B2
(45) Date of Patent: May 27, 2014

(54) IMAGE PROCESSING APPARATUS, IMAGE FORMING APPARATUS, AND COMPUTER READABLE MEDIUM STORING PROGRAM

(75) Inventors: Jun Koyatsu, Kanagawa (JP); Masahiko Kubo, Kanagawa (JP); Toshifumi Takahira, Kanagawa (JP); Hidetoshi Kawashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 234 days.

(21) Appl. No.: 13/250,467

(22) Filed: Sep. 30, 2011

(65) Prior Publication Data

US 2012/0229820 A1 Sep. 13, 2012

(30) Foreign Application Priority Data

Mar. 8, 2011 (JP) ................. 2011-050294

(51) Int. Cl.
 *H04N 1/60* (2006.01)
 *G03F 3/08* (2006.01)
 *H04N 1/46* (2006.01)
 *G06K 9/00* (2006.01)

(52) U.S. Cl.
 USPC ............ 358/1.9; 358/518; 358/504; 382/167; 382/162

(58) Field of Classification Search
 USPC ........................................................ 358/1.9
 See application file for complete search history.

(56) References Cited

U.S. PATENT DOCUMENTS

| | | | |
|---|---|---|---|
| 5,162,860 A * | 11/1992 | Nami et al. ................... 358/501 |
| 7,125,114 B2 * | 10/2006 | Tsujimoto ..................... 347/105 |
| 7,336,394 B2 * | 2/2008 | Tsujimoto ..................... 358/1.9 |
| 7,468,820 B2 * | 12/2008 | Ng et al. ...................... 358/518 |
| 8,203,758 B2 * | 6/2012 | Itagaki ......................... 358/1.9 |
| 2003/0137679 A1 * | 7/2003 | Nakazawa et al. ............ 358/1.6 |
| 2004/0008869 A1 * | 1/2004 | Tsujimoto ..................... 382/108 |
| 2004/0114168 A1 * | 6/2004 | Kuiper ......................... 358/1.9 |
| 2005/0111016 A1 * | 5/2005 | Yoneyama et al. ............ 358/1.9 |
| 2005/0185553 A1 * | 8/2005 | Tsujimoto .................. 369/53.22 |
| 2005/0243341 A1 * | 11/2005 | Ng ............................... 358/1.9 |
| 2006/0187505 A1 * | 8/2006 | Ng et al. ...................... 358/518 |
| 2006/0210295 A1 * | 9/2006 | Nakaya et al. ................. 399/75 |
| 2007/0201097 A1 * | 8/2007 | Anderson et al. ............ 358/3.06 |
| 2007/0287082 A1 * | 12/2007 | Ng ............................. 430/47.5 |
| 2008/0193860 A1 * | 8/2008 | Hains .............................. 430/5 |
| 2009/0244557 A1 * | 10/2009 | Itagaki .......................... 358/1.6 |
| 2010/0027040 A1 * | 2/2010 | Kuroda .......................... 358/1.9 |
| 2010/0097666 A1 * | 4/2010 | Makino et al. ................ 358/475 |

(Continued)

FOREIGN PATENT DOCUMENTS

JP 2007-060149 A 3/2007

*Primary Examiner* — Madelein A Nguyen
(74) *Attorney, Agent, or Firm* — Sughrue Mion, PLLC

(57) ABSTRACT

An image processing apparatus includes a setting unit, a generating unit, and a converting unit. The setting unit sets a gloss level of each of plural areas into which an image is divided. The image is formed by forming plural toner images having different colors using plural first toners and at least one second toner having at least one same color as the first toners and by fixing the plural toner images onto a recording medium so as to be superimposed on one another. The generating unit generates multi-level image data for each of the first toners and the at least one second toner in accordance with the gloss levels set by the setting unit. The converting unit converts multi-level image data of toners having the same color into binary image data. The converting unit also converts multi-level image data of toners having different colors into binary image data.

8 Claims, 9 Drawing Sheets

(56) References Cited

U.S. PATENT DOCUMENTS

| | | | |
|---|---|---|---|
| 2010/0196022 A1* | 8/2010 | Shiozawa | 399/38 |
| 2010/0196035 A1* | 8/2010 | Takemura | 399/67 |
| 2011/0182607 A1* | 7/2011 | Takemura | 399/67 |
| 2012/0229819 A1* | 9/2012 | Koyatsu et al. | 358/1.1 |
| 2012/0236338 A1* | 9/2012 | Kita et al. | 358/1.9 |

* cited by examiner

IMAGE PROCESSING APPARATUS, IMAGE FORMING APPARATUS, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-050294 filed Mar. 8, 2011.

BACKGROUND (i) Technical Field

The present invention relates to an image processing apparatus, an image forming apparatus, and a computer readable medium storing a program.

SUMMARY

According to an aspect of the invention, there is provided an image processing apparatus including a setting unit, a generating unit, and a converting unit. The setting unit sets a gloss level of each of plural areas into which an image to be formed is divided. The image to be formed is formed by forming plural toner images having different colors using plural first toners and at least one second toner and by fixing the plural toner images onto a recording medium so as to be superimposed on one another. The plural first toners have different colors and give a first gloss level after a fixing operation. The at least one second toner has at least one color that is the same as at least one of the colors of the first toners, and gives a second gloss level different from the first gloss level after the fixing operation. The generating unit generates multi-level image data for each of the first toners and the at least one second toner, which are to be used to form an image, in accordance with the gloss levels set by the setting unit so that the gloss levels obtained after the fixing operation are different from each other and so that toners having the same color are not used in the same area. The converting unit converts pieces of multi-level image data of toners having the same color among the first toners and the at least one second toner into binary image data using threshold patterns having the same screen angle or screen angles whose difference is less than a predetermined first angle and having the same screen ruling or screen rulings whose difference is less than a predetermined value. The converting unit also converts pieces of multi-level image data of toners having different colors among the first toners and the at least one second toner into binary image data using threshold patterns having screen angles whose difference is greater than or equal to a second angle greater than the first angle and having the same screen ruling or screen rulings whose difference is less than the predetermined value.

BRIEF DESCRIPTION OF THE DRAWINGS

Exemplary embodiment(s) of the present invention will be described in detail based on the following figures, wherein.

DETAILED DESCRIPTION

An exemplary embodiment will be described in detail hereinafter with reference to the drawings.

Figure 1:
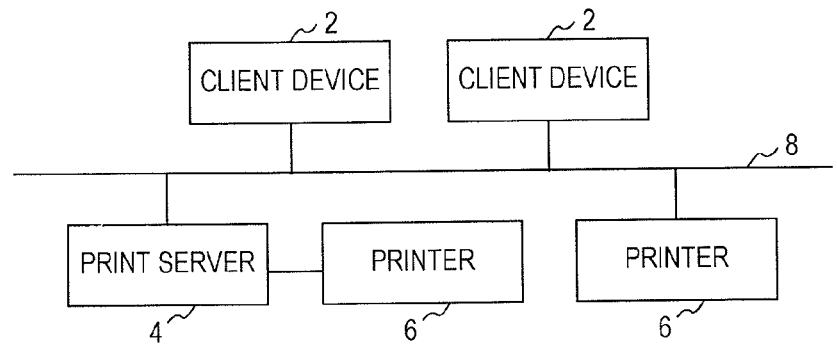
FIG. 1 illustrates plural client devices and a print server which are connected to each other via a communication medium.

In this exemplary embodiment, as illustrated in FIG. 1, plural client devices 2 and a print server 4 are connected to each other via a communication medium 8. The communication medium 8 may be a public line or may be a network such as the Internet, a local area network (LAN), or a wide area network (WAN). The communication medium 8 may also be a wireless communication medium or a wired communication medium. A printer 6 is connected to the print server 4 with or without using the communication medium 8.

Each of the client devices 2 generates image forming information to allow the printer 6 to form an image, and transmits the image forming information to the print server 4. The image forming information may be written in, for example, a page description language, and includes image information representing an image to be formed.

The print server 4 analyzes image forming information received from one of the client devices 2, and generates multi-level image data for each image forming material (hereinafter referred to as "toner") in accordance with the image forming information. The multi-level image data for each toner represents density values corresponding to the amount of toner, on a pixel-by-pixel basis, which is used in the printer 6 to form an image. Then, the print server 4 binarizes the multi-level image data to obtain binary image data, and outputs the binary image data to the printer 6.

The printer 6 forms an image using toner in accordance with the image data output from the print server 4.

Figure 2:
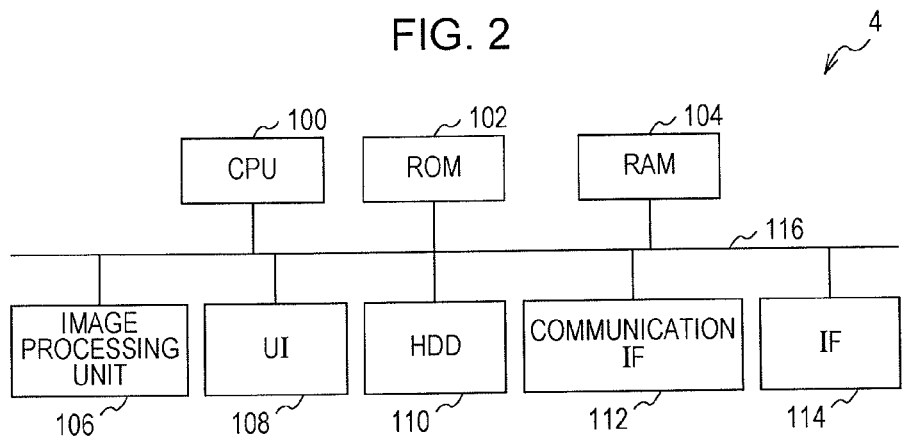
FIG. 2 illustrates an example of the configuration of a print server and a client device.

FIG. 2 illustrates an example of the configuration of the print server 4.

The print server 4 according to this exemplary embodiment includes a central processing unit (CPU) 100, a read only memory (ROM) 102, a random access memory (RAM) 104, an image processing unit 106, a user interface (UI) 108, a hard disk drive (HDD) 110, a communication interface (IF) 112, and an interface (IF) 114, which are connected to one another via a bus 116.

The CPU 100 executes a program stored in the ROM 102 or the HDD 110 to control the overall operation of the print server 4. The ROM 102 stores the program to be executed by the CPU 100, data necessary for the processes of the CPU 100, and any other appropriate data. The RAM 104 may be used as a work memory. The RAM 104 has an area serving as an image memory configured to store image data and the like for each toner, which has been generated by image processing operations such as rasterization and color conversion. Rasterization is a process for generating multi-level bitmap image data (raster data) from image forming information.

The HDD 110 stores the program to be executed by the CPU 100, and various kinds of data.

The storage media for storing the program to be executed by the CPU 100 are not limited to the HDD 110 and the ROM 102. Other storage media such as a flexible disk, a digital versatile disk (DVD), a magneto-optical disk, and a universal serial bus (USB) memory (not illustrated) may be used, or a memory of another device connected to the communication medium 8 may be used.

The image processing unit 106 executes various image processing operations such as rasterization and color conversion in accordance with image forming information received from a client device 2 to generate image data corresponding to each toner. The image processing unit 106 may be, for example, an application specific integrated circuit (ASIC), a field-programmable gate array (FPGA), or the like. The detailed configuration of the image processing unit 106 will be described below.

The UI 108 may be, for example, a liquid crystal display or the like, and includes a display unit and an operation unit. The display unit displays various images, messages, etc., under control of the CPU 100. The operation unit includes, for example, a keyboard and a mouse, and is operated by a user to specify various kinds of information.

The communication IF 112 may be an interface configured to transmit and receive data to and from another device via the communication medium 8.

The IF 114 may be an interface for providing connection with the printer 6 without using the communication medium 8.

Each of the client devices 2 described above may also have a configuration similar to the print server 4. It is to be noted that the program to be executed by a CPU in each of the client devices 2 includes various application software programs and programs for generating and transmitting the image forming information described above.

Figure 3:
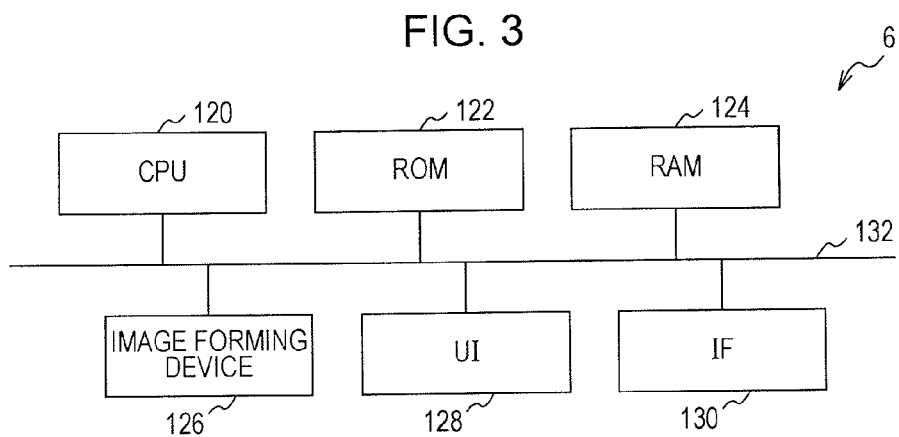
FIG. 3 illustrates an example of the configuration of a printer.

FIG. 3 illustrates an example of the configuration of the printer 6. Here, an example of the configuration of the printer 6 that is connected to the print server 4 without using the communication medium 8 will be described.

The printer 6 includes a CPU 120, a ROM 122, a RAM 124, an image forming device 126, a UI 128, and an IF 130, which are connected to one another via a bus 132.

The CPU 120 executes a program (including, for example, a program for receiving binary image data corresponding to each toner from the print server 4 and controlling the image forming device 126 to form an image in accordance with the received binary image data) stored in the ROM 122 to control the overall operation of the printer 6. The ROM 122 stores the program to be executed by the CPU 120, data necessary for the processes of the CPU 120, and any other appropriate data. The RAM 124 may be used as a work memory.

The storage medium for storing the program to be executed by the CPU 120 is not limited to the ROM 122. Other storage media such as a flexible disk, a DVD, a magneto-optical disk, and a USB memory (not illustrated) may be used.

The image forming device 126 forms an image in accordance with the binary image data received from the print server 4. The configuration of the image forming device 126 will be described below.

The IF 130 may be an interface for providing connection with the print server 4.

The UI 128 includes, for example, a touch panel display configured such that a touch panel is placed over a display, and operation buttons. Various kinds of information may be displayed on the UI 128, and various kinds of information and settings may be input through the UI 128 by the operation of the user.

Although not illustrated in FIG. 3, if the printer 6 is connected directly to the communication medium 8, the printer 6 includes, in addition to the above configuration, a communication IF configured to be connected to the communication medium 8.

Figure 4:
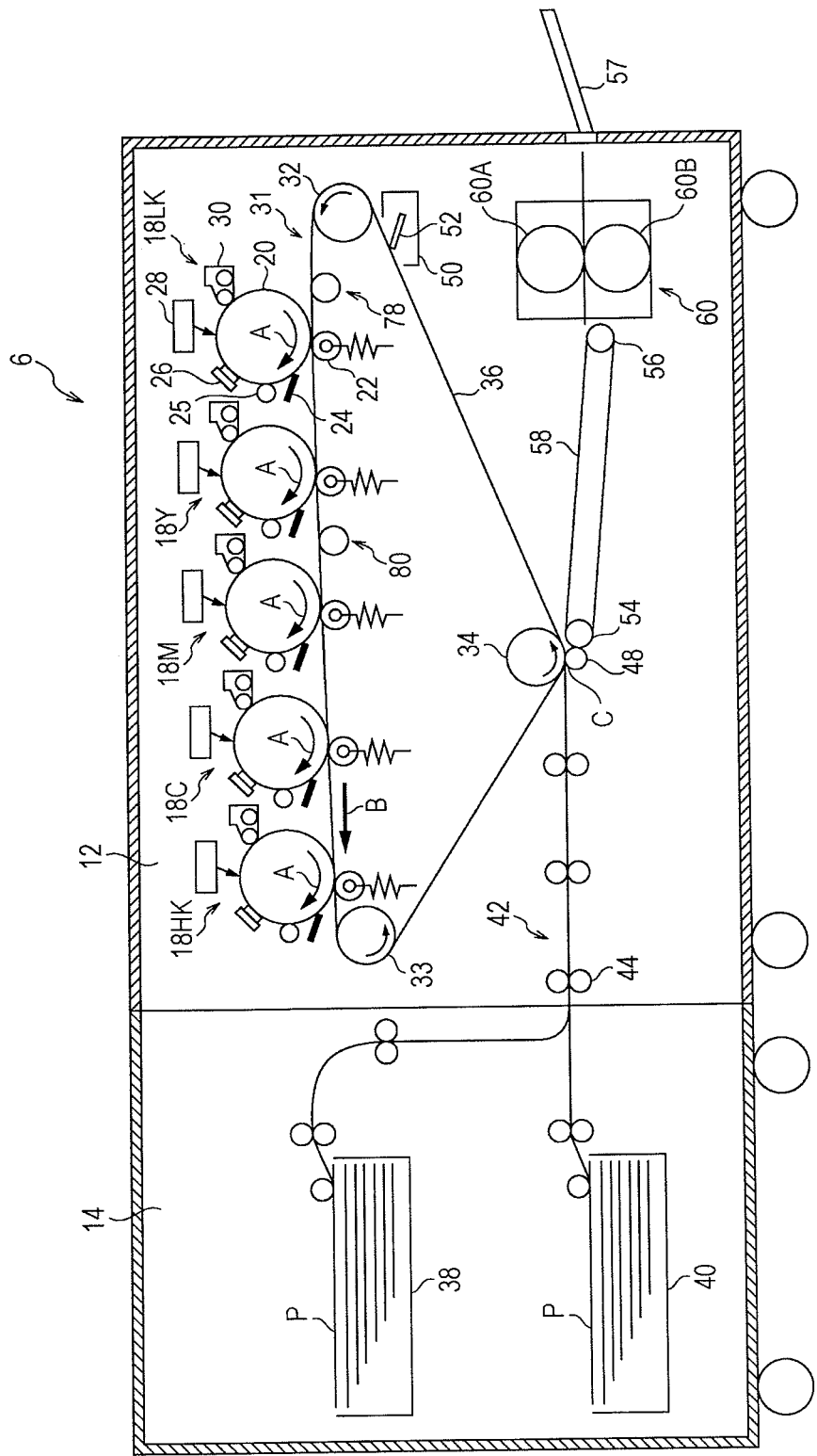
FIG. 4 illustrates a schematic configuration of an image forming device.

FIG. 4 schematically illustrates the configuration of the image forming device 126.

As illustrated in FIG. 4, the image forming device 126 includes an image forming mechanism section 12 configured to form an image on a recording medium (in this exemplary embodiment, a sheet of recording paper P), and a paper feed mechanism section 14 configured to feed a sheet of recording paper P to the image forming mechanism section 12.

The image forming mechanism section 12 includes image forming units 18LK, 18Y, 18M, 18C, and 18HK, which are arranged in order from the upstream side in the rotation direction of photoconductors 20 (which is indicated by the arrow A, hereinafter referred to as the "process direction"). The image forming units 18LK, 18Y, 18M, 18C, and 18K develop electrostatic latent images formed on corresponding ones of the photoconductors 20 using toners (color toners) of low-gloss black (LK), high-gloss yellow (Y), high-gloss magenta (M), high-gloss cyan (C), and high-gloss black (HK), respectively, to form color toner images of the respective colors.

In other words, in this exemplary embodiment, the image forming device 126 is configured to be capable of forming high-gloss toner images of cyan, magenta, and yellow colors, and forming two black toner images having different gloss levels.

A high-gloss toner is a toner that creates an image having a gloss level in a predetermined first range after the fixing operation, and a low-gloss toner is a toner that creates an image having a gloss level in a second range lower than the first range after the fixing operation. That is, the terms "high gloss" and "low gloss", as used herein, mean relative representations of one with respect to the other, and are used to distinguish one from the other.

In this exemplary embodiment, the image forming unit 18LK is arranged on the most upstream side in the process direction so that, when a low-gloss black toner image is to be formed, the low-gloss black toner image may be deposited on (or transferred onto) the top layer with respect to the recording surface of the recording paper P. If the low-gloss toner image is formed in the second or lower layer with respect to the recording surface of the recording paper P, a low-gloss effect may not necessarily be sufficiently obtained.

In the following description, suffixes Y, M, C, HK, and LK are added to numerals to individually identify Y, M, C, HK, and LK, respectively, and are not used unless Y, M, C, HK, and LK need to be individually identified. Additionally, representations of black (K) with the symbols H and L omitted are used unless high-gloss black (HK) and low-gloss black (LK) need to be individually identified. In addition, just the term "transport direction" is used to refer to the transport direction of the recording paper P.

The image forming unit 18 includes the photoconductor 20. A first transfer roller 22, a cleaning device 24, a charge erasing device 25, a charger 26, an exposure device 28, and a developing device 30 are disposed around the photoconductor 20 in sequence in the rotation direction of the photoconductor 20.

An intermediate transfer member 31 is disposed below the image forming units 18LK, 18Y, 18M, 18C, and 18HK each having the above configuration. The intermediate transfer member 31 includes a support roller 34, support rollers 32 and 33 arranged in the process direction, and an endless intermediate transfer belt 36 stretched over the support rollers 32, 33, and 34.

The image forming units 18LK, 18Y, 18M, 18C, and 18HK are arranged in a line in this order in the direction (which is indicated by the arrow B) in which the intermediate transfer belt 36 travels. Under this condition, the first transfer rollers 22LK, 22Y, 22M, 22C, and 22HK are located at positions facing the photoconductors 20LK, 20Y, 20M, 20C, and 20HK of the image forming units 18LK, 18Y, 18M, 18C, and 18HK, respectively, with the intermediate transfer belt 36 therebetween.

With the above configuration, first, the surface of the photoconductor 20 is charged by the charger 26. Then, the surface of the photoconductor 20 is exposed by the exposure device 28 to form an electrostatic latent image on the surface of the photoconductor 20. The electrostatic latent image is developed by the developing device 30 into a toner image. The toner image on the photoconductor 20 is transferred onto the intermediate transfer belt 36 in the first transfer by the electrostatic suction force caused by the transfer bias applied to the first transfer roller 22.

After the toner image has been transferred onto the intermediate transfer belt 36, the residual toner which has not been transferred and remains on the photoconductor 20 is removed by the cleaning device 24. The charge on the surface of the photoconductor 20 is erased by the charge erasing device 25. After that, the charger 26 again charges the surface of the photoconductor 20 for the next image forming cycle.

In the printer 6 according to this exemplary embodiment, a color image may be formed by each of the image forming units 18LK, 18Y, 18M, 18C, and 18HK performing an image forming process similar to that described above at appropriate timing by taking into account the difference in relative position among the image forming units 18LK, 18Y, 18M, 18C, and 18HK. A low-gloss black toner image, a yellow toner image, a magenta toner image, and a cyan toner image (or a yellow toner image, a magenta toner image, a cyan toner image, and a high-gloss black toner image) are transferred onto the intermediate transfer belt 36 in such a manner that the low-gloss black toner image, the yellow toner image, the magenta toner image, and the cyan toner image (or the yellow toner image, the magenta toner image, the cyan toner image, and the high-gloss black toner image) are superimposed on one another in this order from the bottom of the surface of the intermediate transfer belt 36. Accordingly, a color image is formed. In this exemplary embodiment, control is performed so that the low-gloss black toner image and the high-gloss black toner image are not transferred in the manner of being superimposed on each other in the same area.

For example, the printer 6 may form an image only with black by transferring a toner image formed using the image forming unit 18LK or 18HK onto the intermediate transfer belt 36. Accordingly, a white and black image is formed.

The paper feed mechanism section 14 is disposed side-by-side with respect to the image forming mechanism section 12. The paper feed mechanism section 14 includes paper feed cassettes 38 and 40, each of which stores sheets of recording paper P. A sheet of recording paper P is fed to the image forming mechanism section 12 from one of the paper feed cassettes 38 and 40, and is conveyed to a second transfer position C by plural transport rollers 44 in a transport mechanism 42.

The second transfer position C may be a nip position between the support roller 34 that supports the intermediate transfer belt 36 and a second transfer roller 48 that is brought into press contact with the support roller 34. The electrostatic suction force caused by the transfer bias applied to the second transfer roller 48 allows the toner images formed on the intermediate transfer belt 36 to be transferred onto a sheet of recording paper P transported to the second transfer position C.

The residual toner remaining on the intermediate transfer belt 36 is scraped off the intermediate transfer belt 36 by a cleaning blade 52 of an intermediate transfer belt cleaning device 50 disposed in the vicinity of the support roller 32.

A transport belt 58 wrapped around two rollers 54 and 56 is provided downstream from the second transfer position C. The sheet of recording paper P onto which the toner images on the intermediate transfer belt 36 have been transferred is placed on the transport belt 58, and is transported to a fixing device 60 disposed downstream from the transport belt 58.

A fixing process is performed on the toner images using a pressing roller 60A and a heating roller 60B of the fixing device 60 to fix the toner images onto the sheet of recording paper P. That is, an image is formed on the sheet of recording paper P. The sheet of recording paper P having the image formed thereon is output to a paper output tray 57 on the outside of the printer 6.

As illustrated in FIG. 4, a belt retracting member 78 is provided on the side opposite the transfer surface of the intermediate transfer belt 36 between the photoconductor 20LK (the first transfer roller 22LK) and the support roller 32 on the upstream side in the process direction in which the intermediate transfer belt 36 is stretched.

A fixed support member 80 is provided between the photoconductor 20Y (the first transfer roller 22Y) and the photoconductor 20M (the first transfer roller 22M).

The belt retracting member 78 includes a support member that is brought into contact with and separated from the intermediate transfer belt 36, the support member being raised and lowered by a motor (not illustrated). The image forming unit 18LK is also capable of being brought into contact with and separated from the intermediate transfer belt 36. The first transfer roller 22LK provided opposite the photoconductor drum 20LK of the image forming unit 18LK with the intermediate transfer belt 36 therebetween also has a configuration similar to that of the belt retracting member 78, and is configured to be movable up and down.

Figure 5:
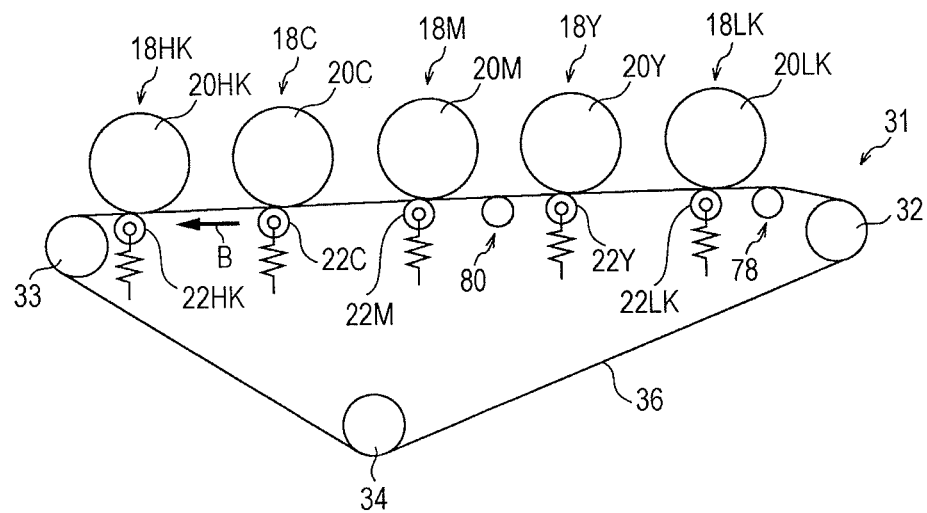
FIG. 5 is a schematic diagram illustrating a position relationship between an intermediate transfer belt and photoconductor drums of respective colors when an image is to be formed using high-gloss four color toners and a low-gloss black toner.

With the above configuration, when the support member of the belt retracting member 78 is raised, the support member is brought into contact with the back side of the intermediate transfer belt 36. Thus, as illustrated in FIG. 5, the transfer surface of the intermediate transfer belt 36 is brought into contact with the photoconductors 20HK, 20Y, 20M, 20C, and 20LK. The surface opposite the transfer surface of the intermediate transfer belt 36 is also brought into contact with the first transfer rollers 22HK, 22Y, 22M, 22C, and 22LK.

Figure 6:
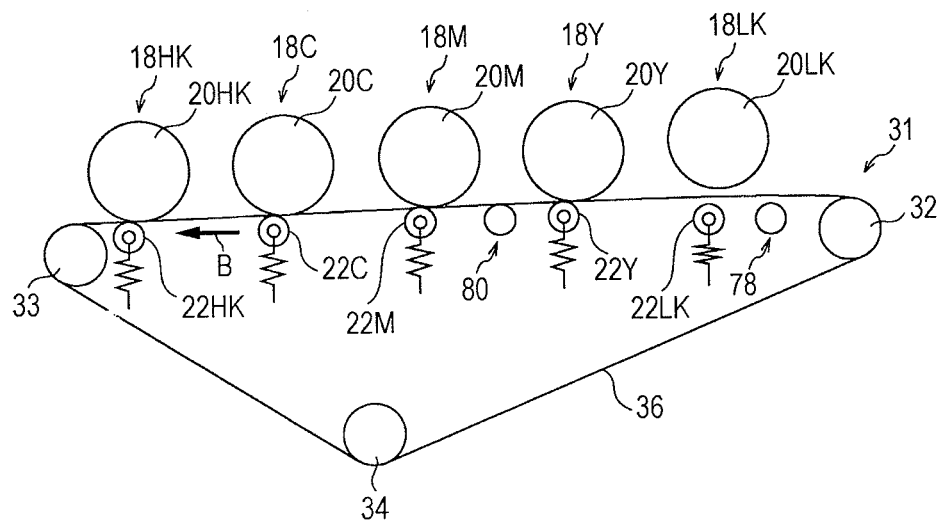
FIG. 6 is a schematic diagram illustrating a positional relationship between the intermediate transfer belt and the photoconductor drums of the respective colors when an image is to be formed in a four-color mode using high-gloss YMCK toners.

When the support member of the belt retracting member 78 is lowered, the transfer surface of the intermediate transfer belt 36 is separated from the photoconductor 20LK. Thus, as illustrated in FIG. 6, the transfer surface of the intermediate transfer belt 36 is brought into contact with the photoconductors 20HK, 20Y, 20M, and 20C, and moves away from the photoconductor 20LK. Further, the surface opposite the transfer surface of the intermediate transfer belt 36 is brought into contact with the first transfer rollers 22HK, 22Y, 22M, and 22C, and moves away from the first transfer roller 22LK.

If the photoconductor 20LK is not in contact with the intermediate transfer belt 36, the rotational driving of the photoconductor 20LK is stopped so that the image forming operation of the image forming unit 18LK is not performed.

When the entire area of the image to be formed is to be formed in a four-color mode using high-gloss YMCK colors, an image is formed in the state illustrated in FIG. 6. When an image is to be formed using a low-gloss black toner in addition to high-gloss four color toners with the gloss level different area by area, an image is formed in the state illustrated in FIG. 5. An effect created when an image is to be formed in the state illustrated in FIG. 5 using a low-gloss black toner in addition to high-gloss four color toners will be described.

Figure 7:
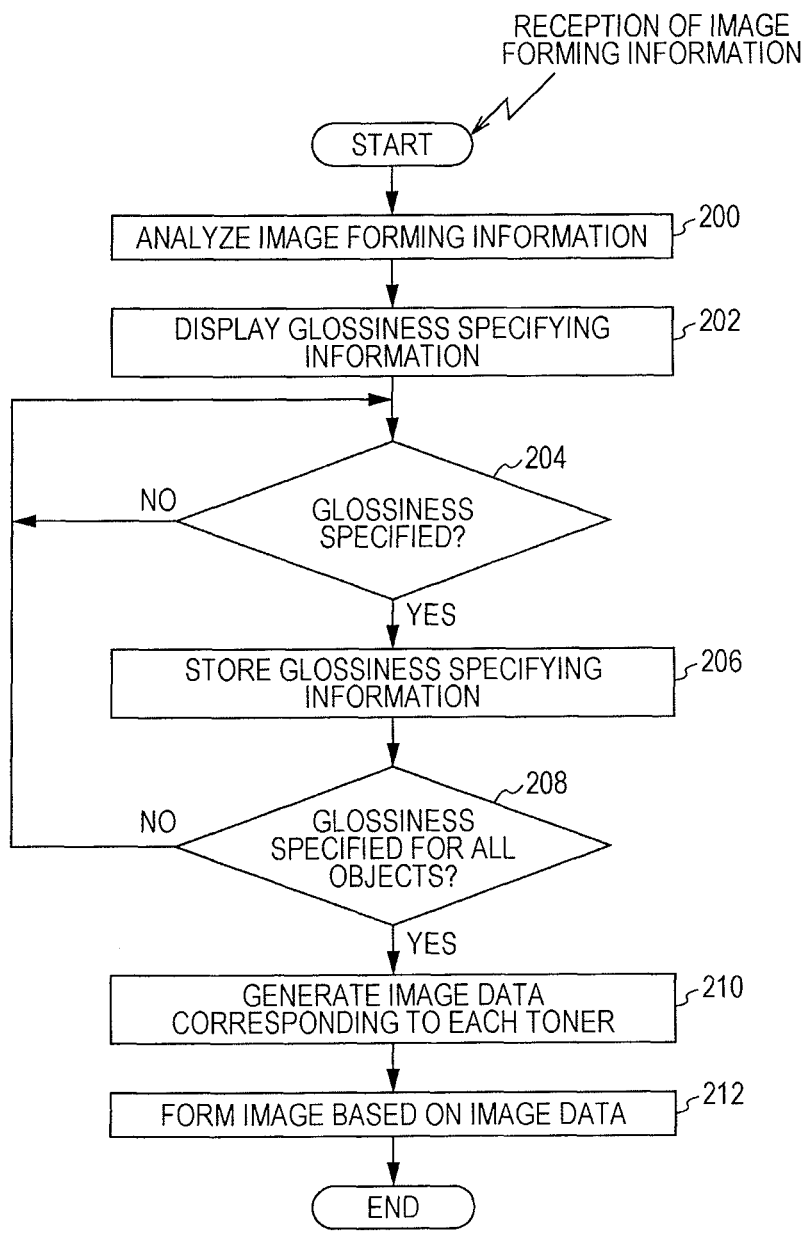
FIG. 7 is a flowchart illustrating a processing routine executed when image forming information is received from a client device.

Upon receipt of image forming information from a client device 2, the print server 4 executes a processing routine illustrated in FIG. 7. A program for performing the processing routine is stored in the ROM 102 or the HDD 110, and is executed by the CPU 100.

In step 200, the received image forming information is analyzed to extract an object in an image to be formed in accordance with the image forming information. An object may be an image of a small area having predetermined attributes. Examples of the predetermined attributes include characters (a character block rather than a single character), a picture, a graph, a ruled line, a table (a character set having matrix elements in an area surrounded by ruled lines), and each cell of a table (each of rows that together form a table), and image data is divided by each of the predetermined attributes. The operation of dividing image data into sections on an object-by-object basis in the manner described above is referred to as extraction of objects. Even images having the same attributes, but which are not adjacent but are spaced apart from each other, may be extracted as different objects.

In step 202, a glossiness specifying screen for allowing a user to specify the glossiness or gloss level of each object is displayed on the UI 108. The user specifies the gloss level of each object in accordance with the glossiness specifying screen. The gloss level of each object may not necessarily be specified quantitatively but may be specified qualitatively. In this exemplary embodiment, a user may specify the gloss level of an object to the "high gloss" level when the user wishes to set the gloss level to a gloss level that is closer to the gloss levels given by the high-gloss C, M, Y, and HK toners after the fixing operation than to the gloss level given by the low-gloss LK toner after the fixing operation. Further, a user may specify the "low gloss" level when the user wishes to set the gloss level of an object to a gloss level that is closer to the gloss level given by the low-gloss LK toner after the fixing operation than to the gloss levels given by the high-gloss C, M, Y, HK toners after the fixing operation.

In step 204, it is determined whether or not a user has specified a gloss level. If a negative determination is made in step 204, the process still stands by. If an affirmative determination is made in step 204, in step 206, information (hereinafter referred to as "glossiness specifying information") indicating the gloss level specified by the user is stored on an object-by-object basis.

In step 208, it is determined whether or not gloss levels have been specified for all the objects. If a negative determination is made in step 208, the process returns to step 204. If an affirmative determination is made in step 208, the process proceeds to step 210.

In step 210, the received image forming information and the glossiness specifying information are output to the image processing unit 106 to cause the image processing unit 106 to execute image processing to generate image data for each toner.

In step 212, the image data corresponding to the respective toners generated by the image processing unit 106 is output to the printer 6, thereby controlling the printer 6 to form an image in accordance with the image data.

Figure 8:
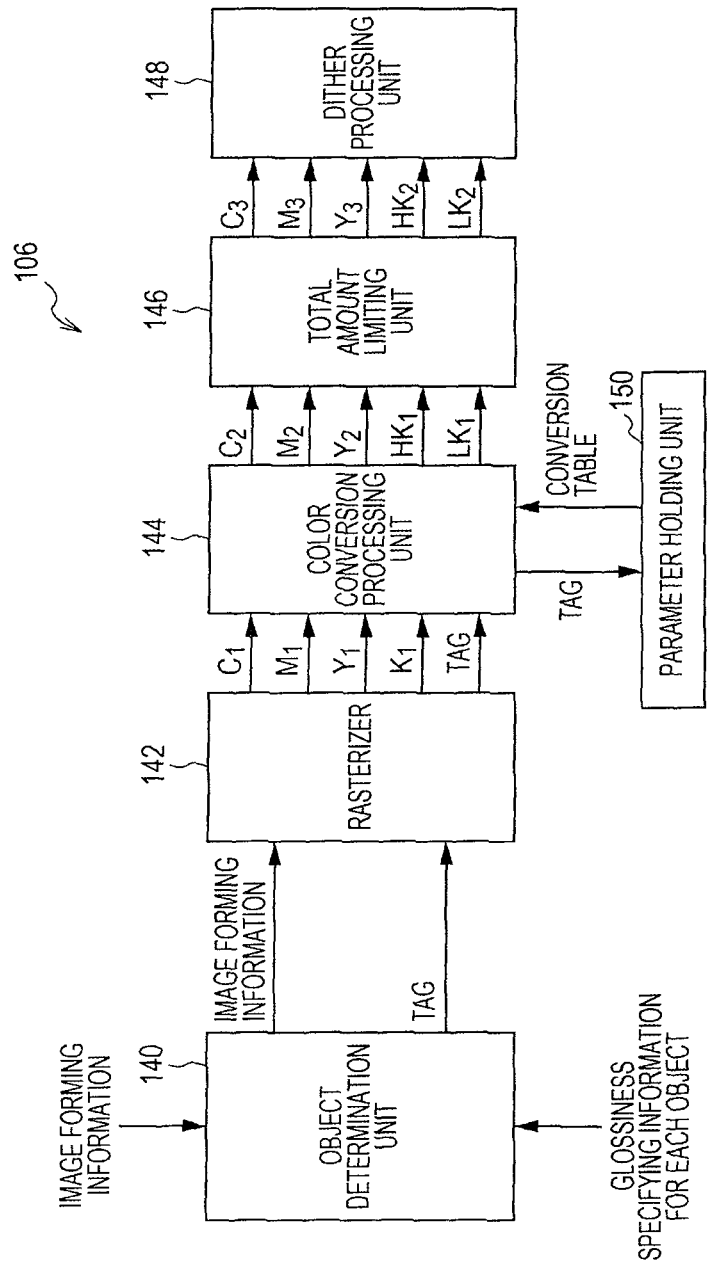
FIG. 8 illustrates an example configuration of an image processing unit.

The configuration of the image processing unit 106 and the image processing performed by the image processing unit 106 will now be described in detail. As illustrated in FIG. 8, the image processing unit 106 includes an object determination unit 140, a rasterizer 142, a color conversion processing unit 144, a total amount limiting unit 146, a dither processing unit 148, and a parameter holding unit 150.

Upon receipt of an input of image forming information and glossiness specifying information, the object determination unit 140 sets a tag indicated by a gloss level (either the high-gloss level or the low-gloss level) identified by the glossiness specifying information for each object included in an image indicated by the image forming information, and outputs the image forming information and the tags set for the respective objects to the rasterizer 142.

The rasterizer 142 performs raster processing in accordance with the input image forming information to generate multi-level bitmap image data (raster data) for each of cyan, magenta, yellow, and black colors. The image data of the respective colors, which is obtained by the rasterizer 142 using the raster processing, may be multi-level image data (hereinafter referred to as "pixel data") indicating the density values of the individual pixels. The rasterizer 142 outputs the generated pixel data and the tag set for the pixel data (the tag set for the object composed of the pixel data) to the color conversion processing unit 144. The pixel data of cyan, magenta, yellow, and black output from the rasterizer 142 are represented by $C_1$, $M_1$, $Y_1$, and $K_1$, respectively.

The color conversion processing unit 144 converts the pixel data $C_1$, $M_1$, $Y_1$, and $K_1$ input from the rasterizer 142 into pixel data $C_2$, $M_2$, $Y_2$, and $HK_1$, or pixel data $C_2$, $M_2$, $Y_2$, and $LK_1$ in accordance with a conversion table (four-input/four-output four-dimensional look-up table (DLUT)) in which parameters corresponding to tags set for the pixel data $C_1$, $M_1$, $Y_1$, and $K_1$ are set, and outputs the pixel data $C_2$, $M_2$, $Y_2$, and $HK_1$, or pixel data $C_2$, $M_2$, $Y_2$, and $LK_1$. Here, $HK_1$ represents pixel data corresponding to the high-gloss K color toner and $LK_1$ represents pixel data corresponding to the low-gloss K color toner.

In this exemplary embodiment, one of two black toners having different gloss levels is selected and used in accordance with the tag. Each of two K color toners is not used in the same area. Therefore, here, a DLUT whose inputs are $C_1$, $M_1$, $Y_1$, and $K_1$ and whose outputs are $C_2$, $M_2$, $Y_2$, and $HK_1$ and a DLUT whose inputs are $C_1$, $M_1$, $Y_1$, and $K_1$ and whose outputs are $C_2$, $M_2$, $Y_2$, and $LK_1$ are switchably used, and one of $HK_1$ and $LK_1$ is set as the value of the pixel data $K_1$. Thus, if the tag output from the rasterizer 142 indicates the high-gloss level, the pixel data $C_1$, $M_1$, $Y_1$, and $K_1$ are converted into pixel data $C_2$, $M_2$, $Y_2$, and $HK_1$, respectively, and are output. In this case, pixel data $LK_1$ is not output. If the tag indicates the low-gloss level, the pixel data $C_1$, $M_1$, $Y_1$, and $K_1$ are converted into pixel data $C_2$, $M_2$, $Y_2$, and $LK_1$, respectively, and are output. In this case, pixel data $HK_1$ is not output. Black for which pixel data is not output is hereinafter referred to as "non-output black".

The parameters in the conversion table (DLUT) used in the color conversion processing unit 144 are held (or stored) in a memory of the parameter holding unit 150 on a tag-by-tag basis. First, the color conversion processing unit 144 outputs the tag input from the rasterizer 142 to the parameter holding unit 150. The parameter holding unit 150 outputs a conversion table in which parameters corresponding to the tag input from the color conversion processing unit 144 are set to the color conversion processing unit 144. The color conversion processing unit 144 converts the pixel data $C_1$, $M_1$, $Y_1$, and $K_1$ in the manner described above in accordance with the conversion table input from the parameter holding unit 150.

In the illustrated example, since the pixel data $K_1$ is simply replaced by pixel data $HK_1$ or $LK_1$, the pixel data of the respective colors are converted as below in accordance with either of the DLUTs described above:

$C_2=C_1$
$M_2=M_1$
$Y_2=Y_1$
$HK_1=K_1$ (when the tag indicates the high-gloss level)
$LK_1=K_1$ (when the tag indicates the low-gloss level)

That is, for each of the cyan, magenta, and yellow colors, the pixel data input to the color conversion processing unit 144 is output as it is.

The conversion method is not limited to that described above. For example, a high-gloss black toner image and a low-gloss black toner image may have different color depths (color reproducibility) even if both toner images are formed using the same amount of toner. This phenomenon is taken into account, and the pixel data $C_1$, $M_1$, $Y_1$, and $K_1$ may be converted using a conversion table used to adjust the density values of the respective colors, instead of using a conversion table used to simply replace the pixel data $K_1$ with the pixel data $HK_1$ or $LK_1$, so that the color depth is not changed regardless of whether the black toner to be used is a high-gloss toner or a low-gloss toner (or so that the difference in color reproducibility may be reduced).

For example, so-called retransfer (or reverse transfer) may occur in which some of toner images that have been transferred onto the intermediate transfer belt 36 in the first transfer are transferred back to the photoconductor 20 side. Retransfer of a toner image may be caused by, for example, the polarity of the toner on the surface of the toner image, which has been transferred onto the intermediate transfer belt 36, being reversed due to discharge at the first transfer position and by electrostatically attracting the toner having the reversed polarity to the photoconductor 20 side. Retransfer may cause a reduction in density. Since retransfer is a phenomenon in which a toner image formed using an image forming unit 18 on the upstream side in the process direction and transferred onto the intermediate transfer belt 36 is transferred back to the photoconductor of an image forming unit 18 provided downstream, some toner images may be affected by retransfer and other toner images may not, depending on the position of the image forming unit 18. For example, a toner image formed using the image forming unit 18HK located on the most downstream side in the process direction may not be affected by retransfer because no image forming unit is located downstream from the image forming unit 18HK, whereas toner images formed using the image forming units 18 provided upstream from the image forming unit 18HK may be affected by retransfer. The color depth may also vary depending on the printing order (the order in which toner images are deposited) as well as retransfer. In addition, the color forming properties differ depending on the gloss level (that is, the higher the gloss level, the higher the smoothness of the surface of the toner image, resulting in a higher color forming property). For this reason, the color depth may differ between an image formed using a high-gloss black toner and an image formed using a low-gloss black toner even if toner images are formed with the same amount of toner.

To address the above inconvenience, the parameter holding unit 150 may hold different parameters also for the CMY colors in accordance with the tag, and output a conversion table in which parameters corresponding to the input tag are set to the color conversion processing unit 144. Further, in the conversion table held in the parameter holding unit 150, only the parameters for $HK_1$ and $LK_1$ may differ in accordance with the tag, or the parameters for $C_2$, $M_2$, and $Y_2$ in addition to $HK_1$ and $LK_1$ may also differ. More specifically, when the tag indicates the high-gloss level, parameters may be set so that, for example, the density value of each piece of pixel data may be converted to a lower density value than that when the tag indicates the low-gloss level. Accordingly, variations in color depth (color reproducibility) may be reduced.

The total amount limiting unit 146, which is provided after the color conversion processing unit 144, converts the pixel data $C_2$, $M_2$, $Y_2$, and $HK_1$ input from the color conversion processing unit 144 into pixel data $C_3$, $M_3$, $Y_3$, and $HK_2$ that have been subjected to total amount limit processing, and outputs the pixel data $C_3$, $M_3$, $Y_3$, and $HK_2$, or converts the pixel data $C_2$, $M_2$, $Y_2$, and $LK_1$ input from the color conversion processing unit 144 into pixel data $C_3$, $M_3$, $Y_3$, and $LK_2$ that have been subjected to total amount limit processing, and outputs the pixel data $C_3$, $M_3$, $Y_3$, and $LK_2$.

If the total amount of toner to be used to form an image on a sheet of recording paper P exceeds a certain threshold, it may be difficult to stably fix toner onto the sheet of recording paper P. If the sheet of recording paper P output under this condition and another sheet of recording paper P are output in such a manner that the sheets of recording paper P are placed on top of each other, problems may occur such as sticking together of the sheets of recording paper P and color staining caused by transferring toner on the sheet of recording paper P to the other sheet of recording paper P. In order to address such problems, in this exemplary embodiment, the total amount limiting unit 146 performs total amount limit processing for correcting multi-level image data so that the total amount of toner to be deposited on a sheet of recording paper P may be controlled.

In the total amount limit processing, correction is performed to reduce the density values for the cyan, magenta, yellow, and black colors by the same ratio so that a total density value that is the sum of density values per pixel (the sum of pixel data values per pixel) of the multi-level image data of the cyan, magenta, yellow, and black colors may not exceed a predetermined upper limit (hereinafter referred to as a "total limit value" or "total area coverage (TAC)").

Specifically, when the pixel data $C_2$, $M_2$, $Y_2$, and $HK_1$ are input from the color conversion processing unit 144, if $C_2+M_2+Y_2+HK_1 \leq TAC$, the input pixel data $C_2$, $M_2$, $Y_2$, and $HK_1$ are output without being converted. If $C_2+M_2+Y_2+HK_1 > TAC$, the input pixel data $C_2$, $M_2$, $Y_2$, and $HK_1$ are processed so that the density values (pixel data) of the respective colors may be reduced by the same ratio, and the resulting pixel data are output. Also when the pixel data $C_2$, $M_2$, $Y_2$, and $LK_1$ are input from the color conversion processing unit 144, total amount limit processing is performed in a manner similar to that described above, and the resulting pixel data are output. Here, by way of example, correction is performed so that the density values of the respective cyan, magenta, yellow, and black colors may be reduced by the same ratio. Alternatively, for example, the density values of the YMC colors may be uniformly reduced while the density value of the K color is kept unchanged, or, conversely, the density value of the K color may be reduced while the density values of the YMC colors are kept unchanged.

Black and gray may be printed only with black although they may be expressed with a mixture of toners of four colors, i.e., cyan, magenta, yellow, and black. Therefore, the total amount limit processing may involve image processing (generally called under color removal (UCR) processing) for replacing three colors, cyan, magenta, and yellow, by black (or uniformly reducing the amounts of CMY toner and increasing the amount of black toner) to keep the sum of the amounts of toner of four colors less than or equal to the total limit value while reducing variations in color depth. In addition, the total amount limit processing may be performed using a look-up table or may be performed by performing calculation using a function.

The dither processing unit 148, which is provided after the total amount limiting unit 146, performs dither processing on the pixel data $C_3$, $M_3$, $Y_3$, and $HK_2$ (or $LK_2$) output from the total amount limiting unit 146 using threshold patterns (hereinafter referred to as "dither matrices") for the respective colors having dither thresholds to binarize the multi-level image data to generate binary image data, and outputs the binary image data. In this exemplary embodiment, a dither matrix corresponding to high-gloss black pixel data ($HK_2$) and a dither matrix corresponding to low-gloss black pixel data ($LK_2$) are set to have the same or substantially the same screen ruling (for example, screen rulings whose difference is less than a predetermined value S1), and have the same or substantially the same screen angle (for example, screen angles whose difference is less than a predetermined value S2). The dither matrices for cyan, magenta, yellow, and black are set to have the same or substantially the same screen ruling (for example, screen rulings whose difference is less than the predetermined value S1), and have different screen angles such that (regardless of whether black is HK or LK) the difference between the screen angles of the respective colors is greater than or equal to a predetermined value S3 (where S2<S3) to avoid or reduce interference between colors.

In this exemplary embodiment, therefore, dither processing is performed on any of C, M, Y, HK, and LK using dither matrices having the same or substantially the same screen ruling. If screen rulings are largely different, the coarseness of dots of a color whose screen ruling is low is made more noticeable than that of dots of a color whose screen ruling is high, resulting in a reduction in image quality. Meanwhile, the screen angles are made different to some extent depending on the color to avoid or reduce interference between colors.

The value S3 may be set so that a difference in screen angle which is greater than or equal to the value S3 brings no interference between colors. For example, the values S2 and S3 may be determined in advance through an experiment or the like so as not to cause interference, and dither matrices may be set so as to satisfy the values S2 and S3. Screen angles may be set, such as 15 degrees for cyan, 45 degrees for black, 75 degrees for magenta, and 30 degrees for yellow with respect to, for example, the horizontal axis, and may not necessarily be changed in equal increments over plural colors.

The binary image data generated and output in the dither processing is output to the printer 6. For the non-output black described above, the dither processing unit 148 may generate and output binary image data having a density value of 0%, or may not output binary image data.

The printer 6 forms an image in accordance with the binary image data input thereto. For the non-output black, binary image data having a density value of 0% may be input to the printer 6 or binary image data itself is not input to the printer 6. Thus, a toner image of the non-output black is not formed.

If the high-gloss black toner and the low-gloss black toner are used in the same area with dither matrices for HK and LK having the same screen ruling and the same screen angle (that is, if an image is formed by transferring a high-gloss black toner image and a low-gloss black toner image in such a manner that the high-gloss black toner image and the low-gloss black toner image are placed on top of each other), interference with a large screen period may occur due to the deformation of the image caused by deformation involved in the exposure system, such as skew fluctuations and varying magnification over a range, and therefore moire, density variation, or glossiness variation may occur. If the deformation of the image is compensated for by shifting the positions of dots on a pixel-by-pixel basis, a digital pixel position changing process allows dots to overlap in the direction of the correction within a corrected area. In other areas, however, short-period interference fringes may occur in order to permit deviation. In contrast, if dither matrices having different screen angles are used for HK and LK, it may be difficult to ensure a sufficient angle of vector for each color, and therefore interference with dither matrices of the other colors may not be avoided. If a binarization process is performed by, instead of performing dither processing, using a frequency modulation (FM) screen having no fixed frequency components (or by performing error diffusion) or a binarization process is performed using a sufficiently high frequency screen in order to avoid interference, deterioration in granularity may be perceived visually. In particular, black shows high granularity sensitivity, leading to easier perception of deterioration in granularity.

In this exemplary embodiment, however, a high-gloss black toner image and a low-gloss black toner image are not transferred in the manner of being superimposed on each other in the same area. Thus, the occurrence of interference may be prevented or reduced even if a dither matrix corresponding to high-gloss black and a dither matrix corresponding to low-gloss black have the same or substantially the same screen angle and the same or substantially the same screen ruling. In addition, deterioration in granularity does not occur.

In this exemplary embodiment, by way of example, the high-gloss or low-gloss level is specified on an object-by-object basis as an example of specifying a gloss level for each of plural areas into which an image to be formed is divided. However, a gloss level may not necessarily be specified on an object-by-object basis, and a gloss level may be specified in accordance with, for example, but not limited to, a position in the image. For example, the high-gloss level may be specified for the upper half portion of the image, and the low-gloss level may be specified for the lower half portion of the image.

Furthermore, instead of specifying a gloss level each time an image is formed, a user may store in advance the type of an object and a gloss level with which an image is formed in association with each other in the HDD 110 of the like of the print server 4 (for example, a user may store the low-gloss level in association with a character object and store the high-gloss level in association with a photographic object), and may set glossiness specifying information for an object extracted by the print server 4 in accordance with the image forming information, the glossiness specifying information indicating glossiness stored in association with the type of the object.

In this exemplary embodiment, by way of example, the color conversion processing unit 144 performs color conversion processing while switching between a four-input/four-output look-up table (DLUT) of C/M/Y/K→C/M/Y/HK or a four-input/four-output DLUT of C/M/Y/K→C/M/Y/LK in accordance with a tag. However, the present invention is not limited to this example. For example, the color conversion processing unit 144 may perform color conversion processing using a five-input/five-output DLUT of C/M/Y/K/tag→C/M/Y/HK/LK. It is to be noted that parameters in a DLUT have been set so that the parameters of one of HK and LK provide NULL (non-output) or a density value of 0% in accordance with a tag. The switching between conversion tables is not required when this DLUT is used.

In this exemplary embodiment, furthermore, by way of example, pixel data of high-gloss black and pixel data of low-gloss black are exclusively output from the color conversion processing unit 144. However, the present invention is not limited to this example, and, for example, pixel data having a density value of 0% may be output for black with which no toner image is to be formed. More specifically, the color conversion processing unit 144 performs conversion using a DLUT with four C/M/Y/K inputs and five C/M/Y/HK/LK outputs. The total amount limiting unit 146, which is provided after the color conversion processing unit 144, is configured to output black pixel data having a density value of 0% to the dither processing unit 148, which is provided after the total amount limiting unit 146, with the density value of 0% being maintained.

Figure 9:
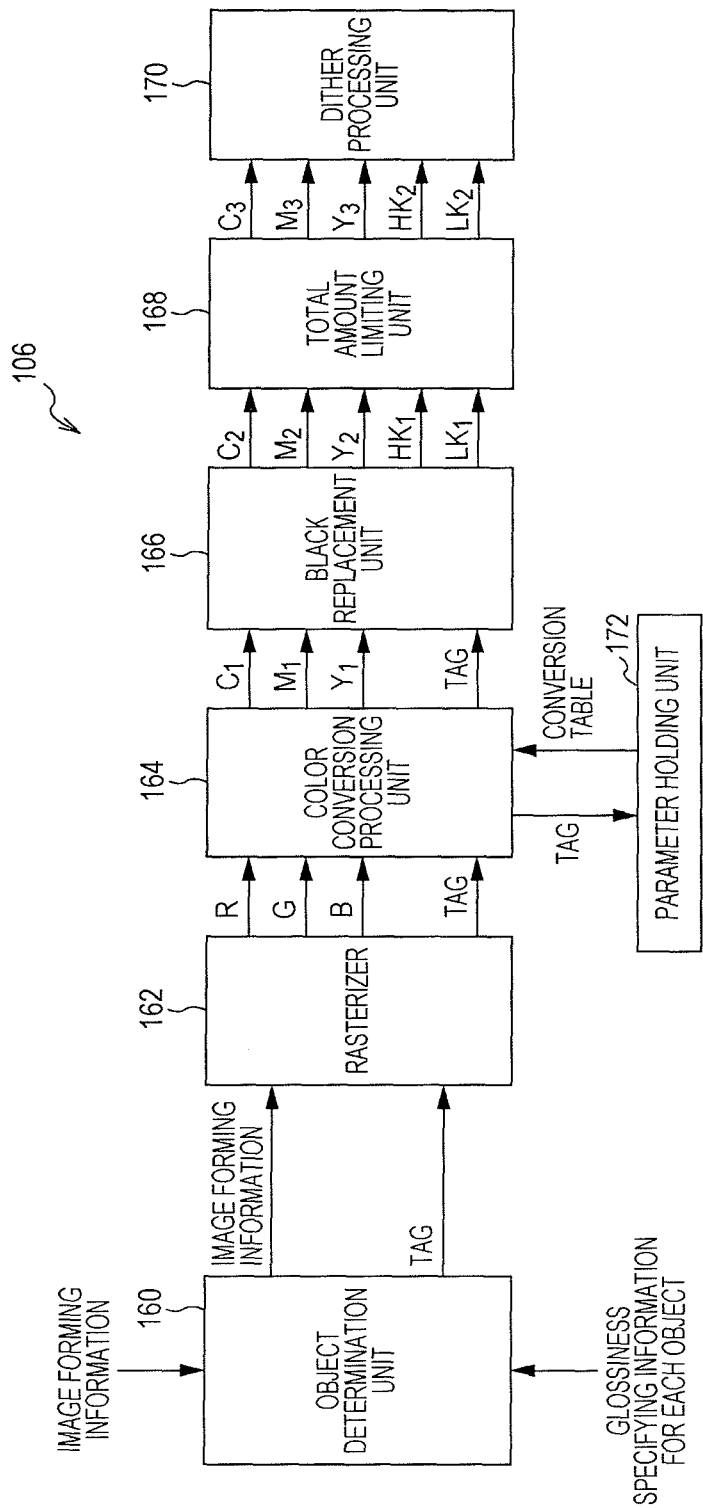
FIG. 9 illustrates another example configuration of the image processing unit.

The image processing unit 106 may also have a configuration illustrated in FIG. 9. In the illustrated example, the image processing unit 106 includes an object determination unit 160, a rasterizer 162, a color conversion processing unit 164, a black replacement unit 166, a total amount limiting unit 168, a dither processing unit 170, and a parameter holding unit 172.

The object determination unit 160 may operate in a manner similar to that of the object determination unit 140 described above with reference to FIG. 8, and a description thereof is thus omitted.

The rasterizer 162 performs raster processing in accordance with image forming information to generate multi-level bitmap image data for each of red (R), green (G), and blue (B) colors, and outputs the multi-level bitmap image data together with a tag. The multi-level image data of each color, which is obtained using the raster processing of the rasterizer 162, is composed of a density value (pixel data) per pixel. The rasterizer 162 outputs the generated pixel data and the tag set for the pixel data (the tag set for the object composed of the pixel data) to the color conversion processing unit 164. The pixel data of the respective RGB colors, which are output from the rasterizer 162, are represented by pixel data R, G, and B.

The color conversion processing unit 164 converts the pixel data R, G, and B input from the rasterizer 162 into pixel data $C_1$, $M_1$, and $Y_1$ using a conversion table (three-input three-output three-dimensional look-up table) in which parameters corresponding to the tag input together with the pixel data R, G, and B, and outputs the pixel data $C_1$, $M_1$, and $Y_1$ together with the tag input together with the pixel data R, G, and B which have not been subjected to color conversion. The parameters in the conversion table used in the color conversion processing unit 164 have been held (or stored) in the memory of the parameter holding unit 172 on a tag-by-tag basis. First, the color conversion processing unit 164 outputs the tag input from the rasterizer 162 to the parameter holding unit 172. The parameter holding unit 172 outputs a conversion table in which parameters corresponding to the tag input from the color conversion processing unit 164 are set to the color conversion processing unit 164. The color conversion processing unit 164 converts the pixel data R, G, and B into pixel data $C_1$, $M_1$, and $Y_1$ in accordance with the conversion table input from the parameter holding unit 172. Here, parameters in a conversion table are made different depending on the tag because, as described above, color reproducibility may differ between when an image is to be formed using the high-gloss black toner and when an image is to be formed using the low-gloss black toner, depending on retransfer, the printing order, or the influences of gloss level or the like. To prevent or reduce variation in color reproducibility, parameters in a conversion table are made different depending on the tag (information indicating the high-gloss or low-gloss level) and pixel data (density values) of the respective colors are adjusted accordingly.

The black replacement unit 166, which is provided after the color conversion processing unit 164, converts the pixel data $C_1$, $M_1$, and $Y_1$ input from the color conversion processing unit 164 into pixel data $C_2$, $M_2$, $Y_2$, and $HK_1$ or $C_2$, $M_2$, $Y_2$, and $LK_1$ in accordance with the tag input together with the pixel data $C_1$, $M_1$, and $Y_1$, and outputs the pixel data $C_2$, $M_2$, $Y_2$, and $HK_1$ or $C_2$, $M_2$, $Y_2$, and $LK_1$. Here, the black replacement unit 166 may generate pixel data $C_2$, $M_2$, and $Y_2$ and black pixel data $HK_1$ or $LK_1$ by performing the UCR processing described above. The black replacement unit 166 may process black pixel data so that if the tag indicates the high-gloss level, the density values of the pixel data $C_2$, $M_2$, and $Y_2$ are reduced while the density value of the pixel data $HK_1$ of high-gloss black is increased and so that if the tag indicates the low-gloss level, the density values of the pixel data $C_2$, $M_2$, and $Y_2$ are reduced while the density value of the pixel data $LK_1$ of low-gloss black is increased.

The total amount limiting unit 168, which is provided after the black replacement unit 166, converts the pixel data $C_2$, $M_2$, $Y_2$, and $HK_1$ input from the black replacement unit 166 into pixel data $C_3$, $M_3$, $Y_3$, and $HK_2$ that have been subjected to total amount limit processing, and outputs the pixel data $C_3$, $M_3$, $Y_3$, and $HK_2$, or converts the pixel data $C_2$, $M_2$, $Y_2$, and $LK_1$ input from the black replacement unit 166 into pixel data $C_3$, $M_3$, $Y_3$, and $LK_2$ that have been subjected to total amount limit processing, and outputs the pixel data $C_3$, $M_3$, $Y_3$, and $LK_2$. The total amount limit processing of the total amount limiting unit 168 may be performed in a manner similar to that of the total amount limit processing of the total amount limiting unit 146 described with reference to FIG. 8, and a description thereof is thus omitted here.

The dither processing unit 170, which is provided after the total amount limiting unit 168, performs dither processing on the pixel data output from the total amount limiting unit 168 using threshold matrices (dither matrices) for the respective colors to binarize the multi-level image data to generate binary image data, and outputs the binary image data. The dither processing performed here and the dither matrices used in the dither processing are similar to the processing performed by and the dither matrices used in the dither processing unit 148 described with reference to FIG. 8, and a description thereof is thus omitted.

In FIG. 9, by way of example, the color conversion processing unit 164 switches between parameters in a three-input three-output LUT of R/G/B→C/M/Y in accordance with a tag, and performs color conversion processing using the parameters. However, the color conversion processing unit 164 may switch between, for example, a three-input/four-output DLUT of R/G/B→C/M/Y/HK or a three-input/four-output DLUT of R/G/B→C/M/Y/LK in accordance with the tag, and may perform color conversion processing using either three-input/four-output DLUT. In this configuration, the black replacement unit 166 may be omitted.

Alternatively, the color conversion processing unit 164 may perform color conversion processing using a four-input/five-output DLUT of R/G/B/tag→C/M/Y/HK/LK. In this case, parameters in a DLUT have been set so that the parameters of one of HK and LK provide NULL (non-output) or a density value of 0% in accordance with a tag. The switching between conversion tables is not required when this DLUT is used.

Figure 10:
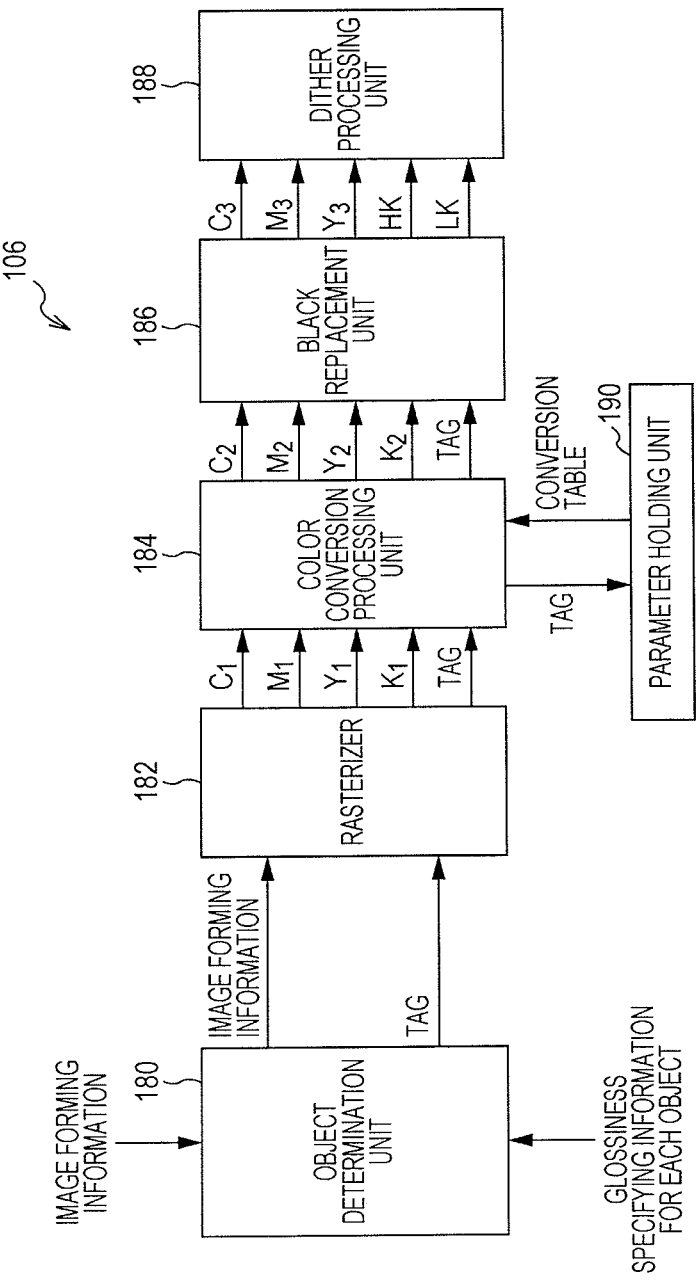
FIG. 10 illustrates another example configuration of the image processing unit.

The image processing unit 106 may also have a configuration illustrated in FIG. 10. In the illustrated example, the image processing unit 106 includes an object determination unit 180, a rasterizer 182, a color conversion processing unit 184, a black replacement unit 186, a dither processing unit 188, and a parameter holding unit 190.

Here, the object determination unit 180 and the rasterizer 182 may operate in a manner similar to the object determination unit 140 and the rasterizer 142 described above with reference to FIG. 8, respectively, and a description thereof is thus omitted.

The color conversion processing unit 184 converts the pixel data $C_1$, $M_1$, $Y_1$, and $K_1$ input from the rasterizer 182 into pixel data $C_2$, $M_2$, $Y_2$, and $K_2$ in accordance with a conversion table (four-input/four-output four-dimensional look-up table) in which parameters corresponding to the tag input from the rasterizer 182 together with the pixel data $C_1$, $M_1$, $Y_1$, and $K_1$ are set, and outputs the pixel data $C_2$, $M_2$, $Y_2$, and $K_2$. The parameters in the conversion table used in the color conversion processing unit 184 have been held (or stored) in the memory of the parameter holding unit 190 on a tag-by-tag basis. The color conversion processing unit 184 outputs the tag output from the rasterizer 182 to the parameter holding unit 190 before performing conversion using a conversion table. The parameter holding unit 190 outputs the conversion table in which parameters corresponding to the tag input from the color conversion processing unit 184 are set to the color conversion processing unit 184. The color conversion processing unit 184 converts the pixel data $C_1$, $M_1$, $Y_1$, and $K_1$ in accordance with the conversion table input from the parameter holding unit 190.

In the color conversion, as described above, color reproducibility may differ between a high-gloss black toner image and a low-gloss black toner image depending on factors such as whether or not retransfer has occurred, the printing order, or the difference in gloss level. The possibility of difference in color reproducibility is taken into account, and the pixel data $C_1$, $M_1$, $Y_1$, and $K_1$ are converted using a conversion table used to adjust the density values of the respective colors in accordance with the tag so that color reproducibility does not vary depending on whether the black toner to be used a high-gloss toner or low-gloss toner.

The black replacement unit 186, which is provided after the color conversion processing unit 184, converts the pixel data $C_2$, $M_2$, $Y_2$, and $K_2$ input from the color conversion processing unit 184 into pixel data $C_3$, $M_3$, $Y_3$, and HK or $C_3$, $M_3$, $Y_3$, and LK, in accordance with the tag input together with the pixel data $C_2$, $M_2$, $Y_2$, and $K_2$, and outputs the pixel data $C_3$, $M_3$, $Y_3$, and HK or $C_3$, $M_3$, $Y_3$, and LK. Here, the pixel data $K_2$ may be replaced by the pixel data HK or LK in accordance with the tag, and the pixel data of the respective CMY colors may be output as they are. Alternatively, the UCR processing described above may be performed to generate pixel data $C_3$, $M_3$, and $Y_3$ and black pixel data (HK or LK) in accordance with the tag. The black replacement unit 186 also has a total amount limit function, and performs conversion so that the total value of the pixel data of the respective colors does not exceed the total limit value (TAC).

The dither processing unit 188, which is located after the black replacement unit 186, performs dither processing on the pixel data output from the black replacement unit 186 using threshold matrices (dither matrices) for the respective colors to binarize the multi-level image data to generate binary image data, and outputs the binary image data. The dither processing performed here and the dither matrices used in the dither processing are similar to the processing performed by and the dither matrices used in the dither processing unit 148 described with reference to FIG. 8, and a description thereof is thus omitted.

In the exemplary embodiment and the modifications described with reference to FIGS. 9 and 10, the image processing unit 106 may be implemented by hardware to execute image processing, by way of example. Alternatively, the image processing described above may be performed by software that executes the functions of the image processing unit 106.

Figure 11:
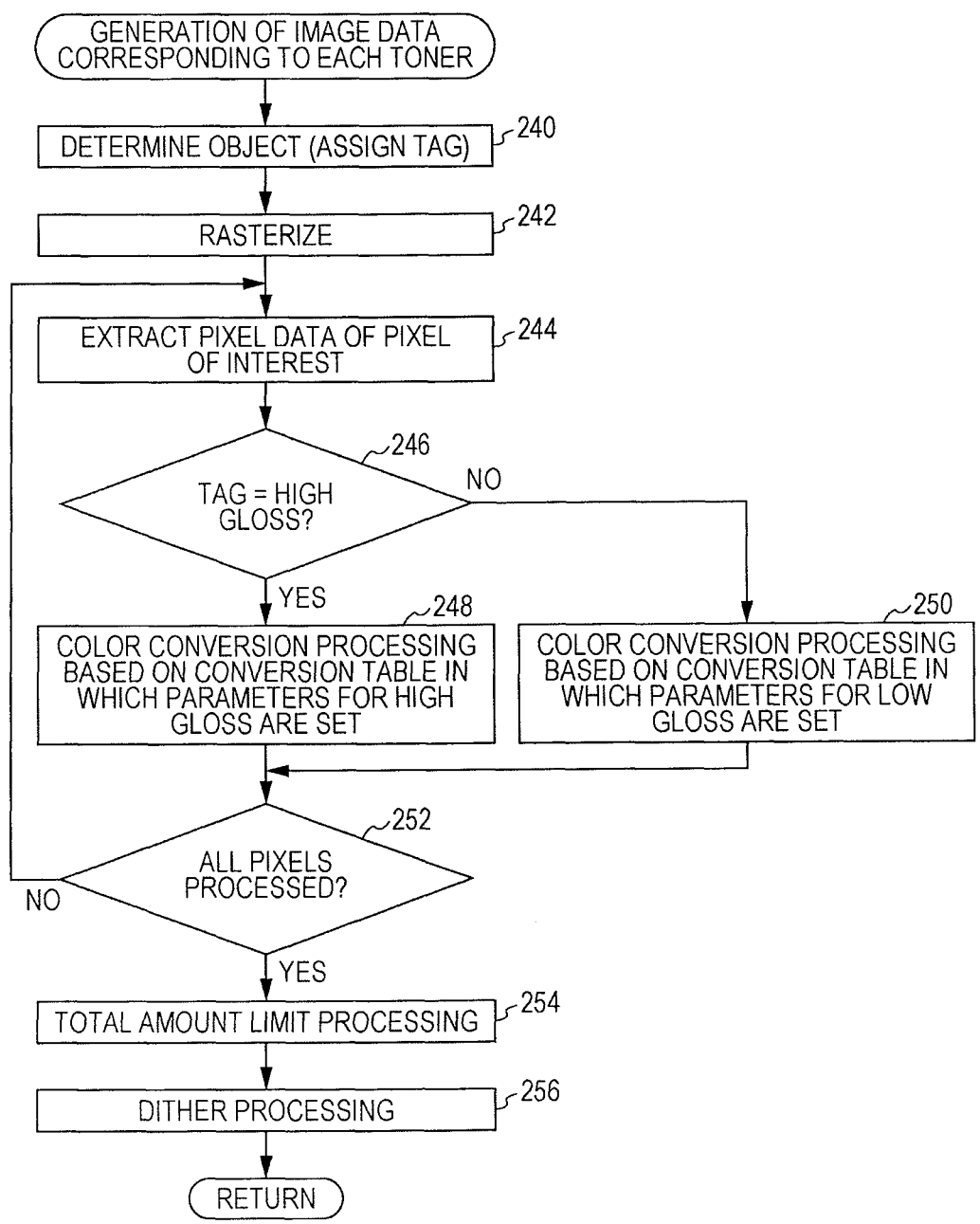
FIG. 11 is a flowchart illustrating a flow of the processing routine for executing image processing similar to that executed by the image processing unit illustrated in FIG. 8.

FIG. 11 is a flowchart illustrating a flow of the processing routine for executing image processing similar to that executed by the image processing unit 106 illustrated in FIG. 8. A program for performing the processing routine is stored in a storage unit such as the HDD 110 or the ROM 102, and is executed by the CPU 100. While a description has been given here of the case where the functions of the image processing unit 106 illustrated in FIG. 8 are executed by software, by way of example, the processes of the individual components described above may be executed in sequence (not illustrated) also when the functions of the image processing unit 106 illustrated in FIGS. 9 and 10 are executed by software.

In step 240, an object is determined (a tag is set). This processing corresponds to the function implemented by the object determination unit 140 illustrated in FIG. 8. In step 242, rasterization is performed in accordance with the image forming information. This processing corresponds to the function implemented by the rasterizer 142 illustrated in FIG. 8.

In step 244, pixel data of a pixel of interest is extracted. In step 246, it is determined whether or not the tag set for the pixel data indicates the high-gloss level. If an affirmative determination is made in step 246, then in step 248, color conversion processing is performed using a conversion table in which parameters used for the high-gloss level are set. If a negative determination is made in step 246, the tag indicates the low-gloss level. Then, in step 250, color conversion processing is performed using a conversion table in which parameters used for the low-gloss level are set.

In step 252, it is determined whether or not the image processing has been completed for all the pieces of pixel data using a conversion table. If a negative determination is made, the process returns to step 244, and the subsequent pixel data is extracted as pixel data of the pixel of interest. Then, the process is repeatedly performed in a manner similar to that described above. If an affirmative determination is made in step 252, the process proceeds to step 254.

The processing of steps 244 to 252 corresponds to the functions implemented by the color conversion processing unit 144 and parameter holding unit 150 illustrated in FIG. 8.

In step 254, total amount limit processing is performed. This processing corresponds to the function implemented by the total amount limiting unit 146 illustrated in FIG. 8. In step 156, dither processing is performed. This processing corresponds to the function implemented by the dither processing unit 148 illustrated in FIG. 8.

Figure 12:
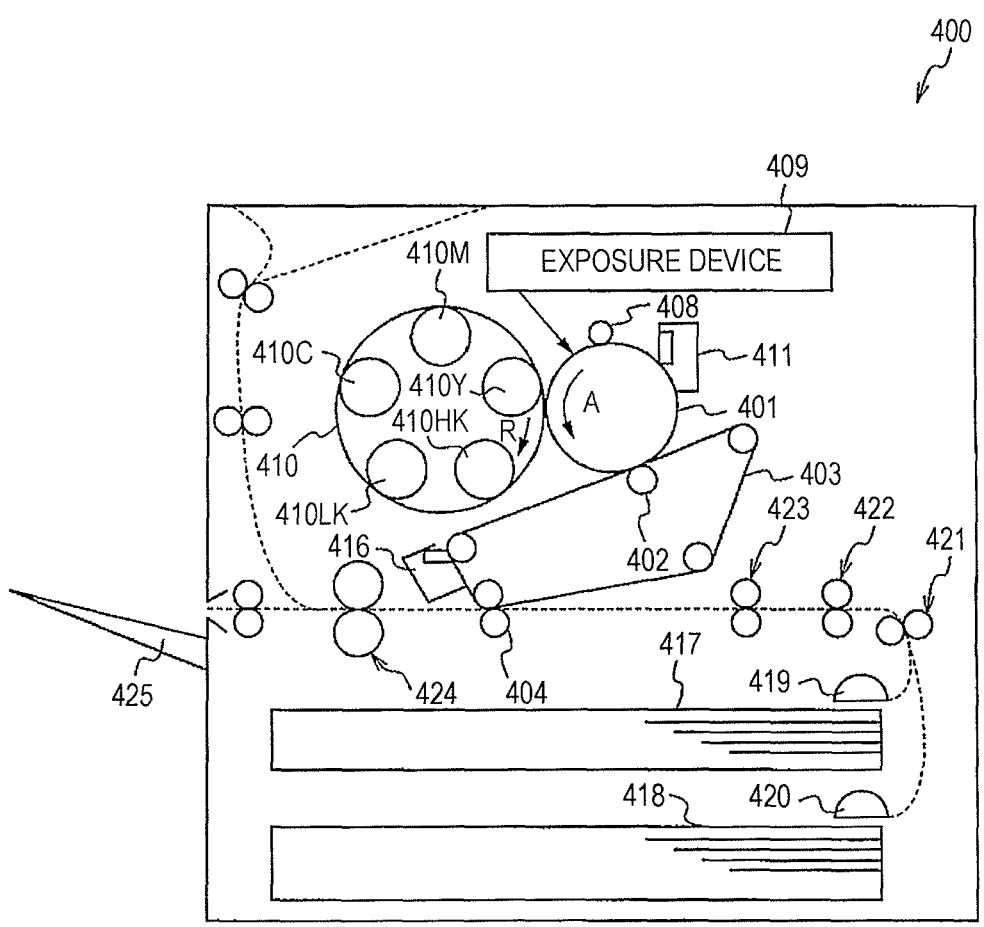
FIG. 12 illustrates another example configuration of the image forming device.

In the exemplary embodiment described above, the image forming device 126 which is a tandem image forming device configured such that the plural image forming units 18 are arranged in the process direction has been described, by way of example. However, the present invention is not limited to this example, and, for example, as illustrated in FIG. 12, an image forming device 400 including a rotary developing device 410 may be used.

A photoconductor 401 is provided so as to rotate in the direction indicated by the arrow A by using a motor (not illustrated). A charging roller 408, an exposure device 409, the developing device 410, a first transfer device 402, and a cleaning device 411 are arranged around the photoconductor 401.

The charging roller 408 charges the surface of the photoconductor 401. The exposure device 409 exposes the charged surface of the photoconductor 401 to a laser beam in accordance with image data to form an electrostatic latent image.

The developing device 410 includes developing units 410Y, 410M, 410C, 410HK, and 410LK arranged along the circumferential direction thereof. The developing units 410Y, 410M, 410C, and 410HK use high-gloss toners of Y, M, C, and K colors, respectively, and the developing unit 410LK uses a low-gloss K color toner. The developing units 410Y, 410M, 410C, 410HK, and 410LK develop electrostatic latent images on the photoconductor 401 using the high-gloss toners of C, M, Y, and K colors and the low-gloss K color toner, respectively. To develop each of the electrostatic latent images, the developing device 410 is driven to rotate in the direction indicated by the arrow R by using a motor (not illustrated), and is positioned so that the corresponding one of the developing units 410Y, 410M, 410C, 410HK, and 410LK may face the latent image on the photoconductor 401.

Toner images developed on the photoconductor 401 are sequentially transferred onto an intermediate transfer belt 403 by the first transfer device 402 so that the respective toner images may be superimposed on one another. The intermediate transfer belt 403 has a belt cleaning unit 416, and a cleaning blade of the belt cleaning unit 416 scrapes residual toner off the intermediate transfer belt 403.

A sheet of recording paper fed to a transport path by one of extraction rollers 419 and 420 from a corresponding one of recording paper cassettes 417 and 418 is transported to a transfer position of a second transfer device 404 by roller pairs 421, 422, and 423. The toner images formed on the intermediate transfer belt 403 are transferred onto the sheet of recording paper at the transfer position, and are fixed under heat by a fixing device 424. The sheet of recording paper is output to an output unit 425 or onto the top surface of the main body of the image forming device 400.

The image forming device 400 may also be used as an image forming device that forms an image in a manner as described in the exemplary embodiment described above.

When an image is to be formed using a low-gloss K color toner by using the image forming device 400, a control instruction is transmitted from the print server 4 to the printer 6 to control the image forming device 400 to form an image in printing order so that a low-gloss K color toner image may be transferred onto the top layer with respect to the recording surface of recording paper.

The foregoing exemplary embodiment has been described in the context of a printer configured to form an image on a recording medium using an intermediate transfer belt, by way of example. A printer configured to transfer a toner image directly onto a recording medium from a photoconductor may also be used.

Furthermore, the foregoing exemplary embodiment has been described in the context of the printer 6 that forms an image using high-gloss CMYK toners and a low-gloss K color toner, by way of example. However, the present invention is not limited to this example, and a printer configured to form an image using low-gloss CMYK toners and a high-gloss K color toner may also be used. A printer configured to form an image using high-gloss CMYK toners and a low-gloss C toner or a printer configured to form an image by using high-gloss CMYK toners and a low-gloss M toner may also be used, or a printer configured to form an image using high-gloss CMYK toners and a low-gloss Y toner may also be used. Even with this configuration, as in the exemplary embodiment described above, for an area (image) for which the high-gloss level has been specified, a high-gloss toner image is formed on the top layer with respect to the recording surface of the recording paper P. For an area (image) for which the low-gloss level has been specified, a low-gloss toner image is formed on the top layer with respect to the recording surface of the recording paper. Furthermore, toner images formed using toners having the same color and giving different gloss levels after the fixing operation are not formed to be superimposed on one another in the same area. Additionally, in the dither processing, each piece of multi-level image data of toners having the same color and giving different gloss levels after the fixing operation is converted into binary image data using a threshold pattern having the same screen angle or screen angles whose difference is less than a predetermined value S2 and the same screen ruling or screen rulings whose difference is less than a predetermined value S1, and each piece of multi-level image data of toners having different colors is converted into binary image data using a threshold pattern having screen angles whose difference is greater than or equal to a predetermined value S3 and having the same screen ruling or screen rulings whose difference is less than the predetermined value S1.

Alternatively, a printer configured to form an image using high-gloss CMYK toners and low-gloss CK toners may be used. A tandem printer may be configured such that image forming units of low-gloss CK colors are located upstream from image forming units of high-gloss CMYK colors in the process direction. This printer is also configured such that toner images formed using toners having the same color and giving different gloss levels are not formed to be superimposed on one another in the same area. However, multi-level image data may be generated so that, for example, in an area for which the low-gloss level has been set, a toner image on the top layer with respect to the recording surface of recording paper and a toner image on the layer immediately below the top layer (i.e., the second layer) are formed using low-gloss toners, and toner images in the other layers are formed using high-gloss toners, and so that in an area for which the high-gloss level has been set, the toner images are formed only using high-gloss toners.

Furthermore, multi-level image data may be generated so that in an area for which the low-gloss level has been set, only a toner image on the top layer is formed using a low-gloss toner or both a toner image on the top layer and a toner image in the second layer are formed using low-gloss toners in accordance with the amount of toner of the toner image on the top layer (density value of multi-level image data obtained immediately before dither processing is performed) with respect to the recording surface of the recording paper. For example, if it is known in advance that the amount of low-gloss toner (density value) per pixel is less than a predetermined value and that the intended gloss level will not be obtained even when the toner image on the top layer is a low-gloss toner image, the parameters in the conversion table used in the color conversion processing unit are set so that the toner image in the second layer is also formed using a low-gloss toner. Even in this configuration, as in the configuration described above, in the dither processing, each piece of multi-level image data of toners having the same color and giving different gloss levels after the fixing operation is converted into binary image data using a threshold pattern having the same screen angle or screen angles whose difference is less than a predetermined value S2 and having the screen ruling or screen rulings whose difference is less than a predetermined value S1. In addition, each piece of multi-level image data of toners having different colors and giving the same gloss level after the fixing operation is converted into binary image data using a threshold pattern having screen angles whose difference is greater than or equal to a predetermined value S3 and having the same screen ruling or screen rulings whose difference is less than the predetermined value.

Alternatively, a printer configured to form an image using low-gloss CMYK toners and high-gloss CK toners may be used. Also, a printer configured to form an image using high-gloss CMYK toners and low-gloss CMK toners, or a printer configured to form an image using low-gloss CMYK toners and high-gloss CMK toners may be used. In any case, if a tandem printer is used, the printer is configured such that image forming units using low-gloss toners are located upstream from image forming units using high-gloss toners in the process direction. Furthermore, toner images formed using toners having the same color and giving different gloss levels are not formed to be superimposed on one another in the same area. Moreover, the generation of multi-level image data or the dither processing may be performed in a manner similar to that described above.

The printer 6 may also be a printer capable of forming an image using high-gloss CMYK toners and low-gloss CMYK toners. More specifically, a printer having an image forming device 126 including eight image forming units 18 corresponding to high-gloss CMYK toners and low-gloss CMYK toners may be used.

Even in this configuration, as in the foregoing exemplary embodiment, toner images may be formed in accordance with glossiness specifying information so that in an area (or image) for which the high-gloss level has been specified, a high-gloss toner image is formed on the top layer with respect to recording paper and so that in an area (or image) for which the low-gloss level has been specified, a low-gloss toner image is formed on the top layer with respect to recording paper. In this case, as in the foregoing exemplary embodiment, multi-level image data is generated so that toner images having the same color and giving different gloss levels are not formed in the area, and is subjected to dither processing to generate binary image data. Dither matrices used in the dither processing may also be set in a manner similar to that described above and may be used.

Also in this case, control may be performed so that if the amount of toner (density value) on the top layer is not sufficient for glossiness effects, the toner on the layer immediately below the top layer (i.e., the second layer) with respect to recording paper is also switched to a toner giving the same gloss level as that on the top layer. For example, in an area in which the low-gloss level is to be set, if the gloss level is not sufficiently low even when the toner on the top layer is set to a low-gloss toner, a toner image may also be formed in the second layer using a low-gloss toner, thereby achieving a gloss level close to the intended gloss level.

Furthermore, the foregoing exemplary embodiment has been described in the context of the printer 6 that forms an image using color toners of the respective CMYK colors, by way of example. Alternatively, a printer configured to form an image using orange, green, and blue (OGB) toners or red, green, and blue (RGB) toners instead of using CMY toners may also be used, and the colors of toners used to form an image are not particularly limited.

In the foregoing exemplary embodiment, furthermore, dither processing is also performed by the print server 4, by way of example. However, dither processing may be performed on the printer 6 side. Additionally, for example, the print server 4 and the printer 6 may be integrally formed. In other words, the printer 6 may have the functions of the image processing unit 106 of the print server 4, and the printer 6 may receive image forming information directly from a client device 2 and perform the image processing described above to generate image data for the respective toners, thereby forming an image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image processing apparatus comprising:
a setting unit that sets a gloss level of each of a plurality of areas into which an image to be formed is divided, the image to be formed being formed by forming a plurality of toner images having different colors using a plurality of first toners and a second toner and by fixing the plurality of toner images onto a recording medium so as to be superimposed on one another, the plurality of first toners having different colors and giving a first gloss level after a fixing operation that fixes the plurality of toner images onto the recording medium, the second toner having one color that is the same as one of the colors of the first toners and giving a second gloss level different from the first gloss level after the fixing operation, the first gloss level being a low gloss level and the second gloss level being a high gloss level;
a generating unit that generates multi-level image data for each of the first toners and the second toner, in accordance with the gloss level of each of a plurality of areas set by the setting unit so that the first gloss level and the second gloss level obtained after the fixing operation are different from each other and so that toners having the same color are not used in the same area; and
a converting unit that converts pieces of multi-level image data of toners having the same color among the first toners and the second toner into binary image data using threshold patterns having the same screen angle or screen angles whose difference is less than a predetermined first angle and having the same screen ruling or screen rulings whose difference is less than a predetermined value, and that converts pieces of multi-level image data of toners having different colors among the first toners and the second toner into binary image data using threshold patterns having screen angles whose difference is greater than or equal to a second angle greater than the first angle and having the same screen ruling or screen rulings whose difference is less than the predetermined value.

2. The image processing apparatus according to claim 1, wherein the generating unit generates the multi-level image data by performing color conversion processing using a conversion table, and switches between parameters in the conversion table in accordance with the gloss level of each of a plurality of areas.

3. The image processing apparatus according to claim 2, wherein the generating unit generates the multi-level image data so that a toner image formed using a toner, whose gloss level after the fixing operation is closer to the gloss level of each of a plurality of areas set by the setting unit among the first toners and the second toner, is deposited on a top layer with respect to a recording surface of the recording medium.

4. The image processing apparatus according to claim 3, further comprising an image forming unit capable of using a plurality of the second toners to form an image,
wherein the generating unit generates the multi-level image data so that if an amount of toner per pixel of a toner image to be deposited on the top layer with respect to the recording surface of the recording medium is less than a predetermined value, a toner image to be deposited on a layer immediately below the top layer is also formed using a toner whose gloss level after the fixing operation is equal to the gloss level of the toner on the top layer.

5. The image processing apparatus according to claim 1, wherein the generating unit generates the multi-level image data so that a toner image formed using a toner whose gloss level after the fixing operation is closer to the gloss level set for each of the areas by the setting unit among the first toners and the second toner is deposited on a top layer with respect to a recording surface of the recording medium.

6. The image processing apparatus according to claim 5, further comprising an image forming unit capable of using a plurality of the second toners to form an image,
wherein the generating unit generates the multi-level image data so that if an amount of toner per pixel of a toner image to be deposited on the top layer with respect to the recording surface of the recording medium is less than a predetermined value, a toner image to be deposited on a layer immediately below the top layer is also formed using a toner whose gloss level after the fixing operation is equal to the gloss level of the toner on the top layer.

7. An image forming apparatus comprising:
an image forming unit that forms an image in accordance with binary image data by forming a plurality of toner images having different colors using a plurality of first toners and a second toner and by fixing the plurality of toner images onto a recording medium so as to be superimposed on one another, the plurality of first toners having different colors and giving a first gloss level after a fixing operation that fixes the plurality of toner images onto the recording medium, the second toner having one color that is the same as at least one of the colors of the first toners and giving a second gloss level different from the first gloss level after the fixing operation, the first gloss level being a low gloss level and the second gloss level being a high gloss level;
a setting unit that sets a gloss level of each of a plurality of areas into which the image formed by the image forming unit is divided;
a generating unit that generates multi-level image data for each of the first toners and the second toner, in accordance with the gloss level of each of a plurality of areas set by the setting unit so that the first gloss level and the second gloss level obtained after the fixing operation are different from each other and so that toners having the same color are not used in the same area; and
a converting unit that converts pieces of multi-level image data of toners having the same color among the first toners and the second toner into binary image data using threshold patterns having the same screen angle or screen angles whose difference is less than a predetermined first angle and having the same screen ruling or screen rulings whose difference is less than a predetermined value, and that converts pieces of multi-level image data of toners having different colors among the first toners and the second toner into binary image data using threshold patterns having screen angles whose difference is greater than or equal to a second angle greater than the first angle and having the same screen ruling or screen rulings whose difference is less than the predetermined value.

8. A non-transitory computer readable medium storing a program causing a computer to execute a process for performing image processing, the process comprising:
setting a gloss level of each of a plurality of areas into which an image to be formed is divided, the image to be formed being formed by forming a plurality of toner images having different colors using a plurality of first toners and a second toner and by fixing the plurality of toner images onto a recording medium so as to be superimposed on one another, the plurality of first toners having different colors and giving a first gloss level after a fixing operation that fixes the plurality of toner images onto the recording medium, the second toner having one color that is the same as one of the colors of the first toners and giving a second gloss level different from the first gloss level after the fixing operation, the first gloss level being a low gloss level and the second gloss level being a high gloss level;
generating multi-level image data for each of the first toners and the second toner, in accordance with the set gloss level of each of a plurality of areas so that the first gloss level and the second gloss level obtained after the fixing operation are different from each other and so that toners having the same color are not used in the same area; and
converting pieces of multi-level image data of toners having the same color among the first toners and the second toner into binary image data using threshold patterns having the same screen angle or screen angles whose difference is less than a predetermined first angle and having the same screen ruling or screen rulings whose difference is less than a predetermined value, and that converts pieces of multi-level image data of toners having different colors among the first toners and the second toner into binary image data using threshold patterns having screen angles whose difference is greater than or equal to a second angle greater than the first angle and having the same screen ruling or screen rulings whose difference is less than the predetermined value.

* * * * *